March 14, 1967 P. R. BOHART 3,308,849
VALVE FOR DUAL MOTOR CONTROL
Filed Oct. 9, 1964 6 Sheets-Sheet 1

INVENTOR
Paul R. Bohart
BY
Howard S. Keiser
& John F. Verhoeven
ATTORNEYS

March 14, 1967   P. R. BOHART   3,308,849
VALVE FOR DUAL MOTOR CONTROL
Filed Oct. 9, 1964   6 Sheets-Sheet 4

March 14, 1967    P. R. BOHART    3,308,849
VALVE FOR DUAL MOTOR CONTROL
Filed Oct. 9, 1964    6 Sheets-Sheet 5
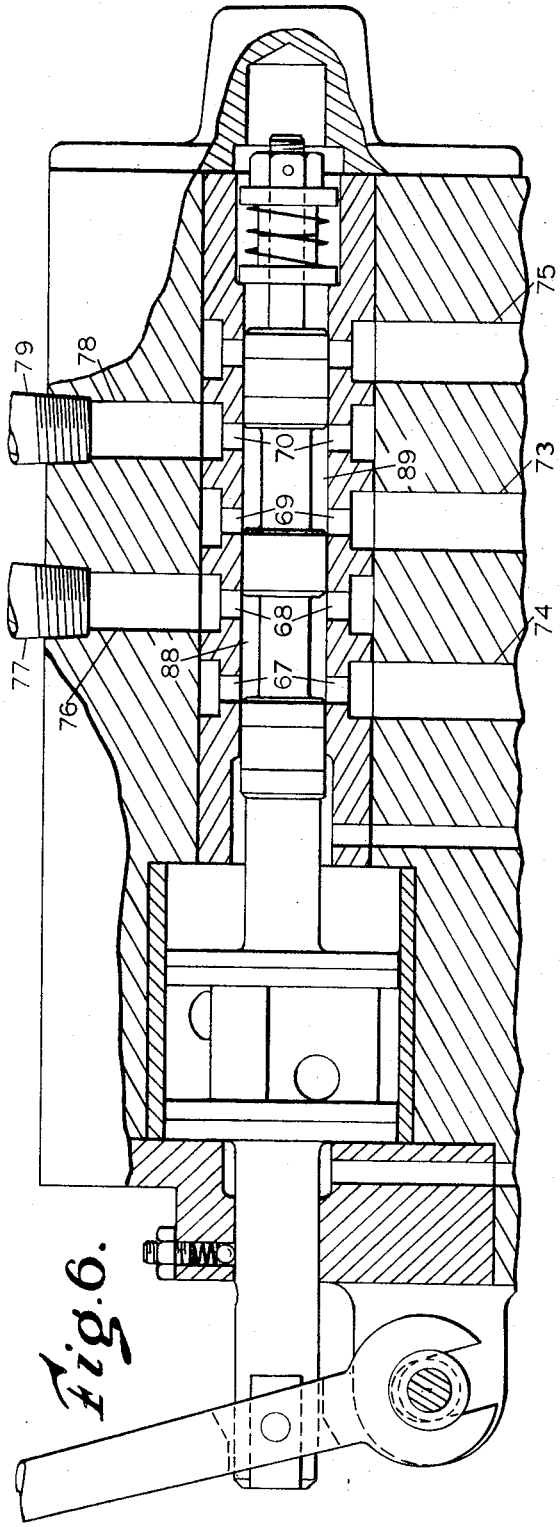
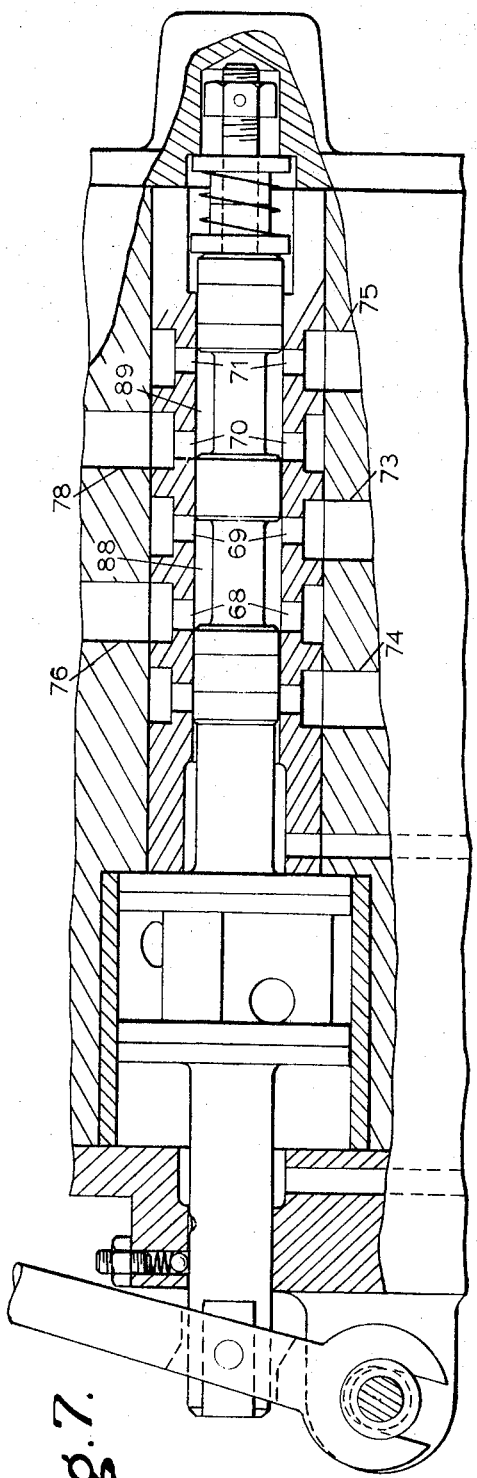
fig. 6.
fig. 7.

March 14, 1967     P. R. BOHART     3,308,849

VALVE FOR DUAL MOTOR CONTROL

Filed Oct. 9, 1964     6 Sheets-Sheet 6

| Position of Handle (Fig.1.) | Position of Rotary Valve Member Portion 32a | Position of Linear Valve Member Portion 32b | Direction of Resultant Slide 10 Movement (Fig.1.) |
|---|---|---|---|
| (+y', +x', -x', -y', E, D) | Fig.3 | Fig.2 | None |
| (E, D horizontal left) | Fig.4 | Fig.2 | ← |
| (E, D angled upper left) | Fig.4 | Fig.7 | ↖ |
| (vertical up) | Fig.3 | Fig.7 | ↑ |
| (angled upper right) | Fig.5 | Fig.7 | ↗ |
| (horizontal right) | Fig.5 | Fig.2 | → |
| (angled lower right) | Fig.5 | Fig.6 | ↘ |
| (vertical down) | Fig.3 | Fig.6 | ↓ |
| (angled, handle upper right) | Fig.4 | Fig.6 | ↙ |

Fig. 9.

United States Patent Office 3,308,849
Patented Mar. 14, 1967

3,308,849
VALVE FOR DUAL MOTOR CONTROL
Paul R. Bohart, Cincinnati, Ohio, assignor to The Cincinnati Milling Machine Co., Cincinnati, Ohio, a corporation of Ohio
Filed Oct. 9, 1964, Ser. No. 402,755
2 Claims. (Cl. 137—625.17)

The present invention relates to a hydraulic valve, and, more particularly, to a hydraulic valve to control two motors either independently or simultaneously.

Many types of apparatus require two hydraulic motors which are sometimes, or always, operated simultaneously. For example, in a typical machine tool construction, a lower slide is moved by a reversible hydraulic motor in one direction and an upper slide is moved on the lower slide in a transverse direction by another reversible hydraulic motor. By operating the motors together at selected speeds and in selected senses, the upper slide can be moved universally in a plane. If each slide is controlled by a separate control handle, great skill is required of the operator to move the upper slide in the desired direction at the desired speed.

The valve of the present invention greatly facilitates for the operator dual motor control. With the valve of the present invention, two slides can be controlled either independently, or simultaneously, with a single control valve handle. In the preferred form of the invention, the valve has two portions, a rotary valve portion and a linear valve portion. A single movable valve member is moved linearly and angularly by a single handle. Movement of the control handle in one plane effects linear movement of the valve member without angular movement thereof and movement of the control handle in a transverse plane effects angular movement of the valve member without linear movement thereof. Intermediate movements of the control handle produce both linear and angular movement of the movable valve member.

Linear movement of the movable valve member effects operation of the hydraulic motor connected to the linear valve portion of the valve but has no affect on the hydraulic motor connected to the rotary valve portion of the valve. Conversely, angular movement of the valve member effects operation of the hydraulic motor connected to the rotary portion of the valve but has no affect on the hydraulic motor connected to the linear valve portion of the valve. Accordingly, simultaneous linear and angular movement of the movable valve member produces simultaneous operation of both hydraulic motors.

The control handle is connected to the movable valve member, and the motors are connected to the valve, so that reversible movement of the control handle in one direction produces reversible movement of a lower slide on a stationary base in the same direction and in the same sense. Reversible movement of the control handle in a transverse direction produces reversible movement of an upper slide on the lower slide in the same direction and in the same sense. Thus, movement of the control handle in any direction in either sense will produce movement of the upper slide in the same direction and in the same sense. The extent of deflection of the control handle determines the speed of movement of the upper slide. Thus, both speed and direction of the upper slide can be controlled without great skill or effort on the part of the operator.

It is therefore one object of the present invention to provide an improved hydraulic valve operable to control two hydraulic motors simultaneously. It is another object of the present invention to provide an improved hydraulic control valve operable to control two hydraulic motors either independently or simultaneously. It is another object of the present invention to provide an improved hydraulic control valve for moving a slide universally in a plane. It is yet another object of the present invention to provide an improved hydraulic control valve having a control handle operable to move a slide in the direction, and in the sense, the handle is moved. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIGS. 6 and 7 are views taken as the view of FIG. 2 except that the movable valve member is shifted to the left and right, respectively, of the position of the movable valve member in FIG. 2;

FIG. 9 is a chart showing the position of the control valve handle and the direction and sense of movement of the upper slide when viewed as in FIG. 1.

Figure 1:
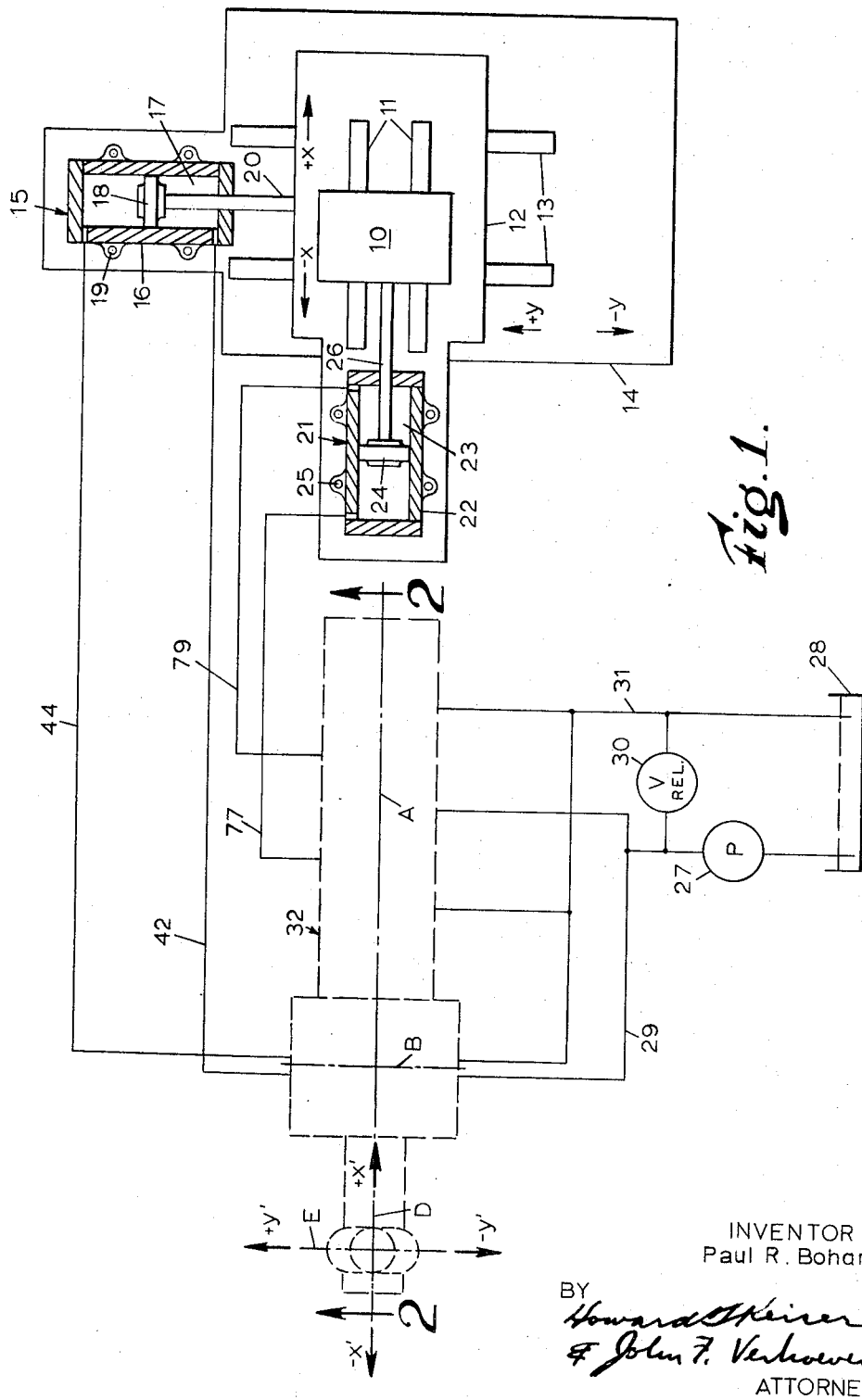
FIG. 1 is a plan view, with parts broken away, of machine tool apparatus controlled by the valve of the present invention.

There is shown in FIG. 1 a slide 10 which may, for example, be a machine tool workpiece supporting slide (which moves relative to a fixed tool, not shown) or a tool supporting slide (which moves relative to a fixed workpiece, not shown). In either case, the slide 10 is mounted on ways 11 of a slide 12 for movement thereon along the ways in the direction indicated by arrows (+x) and (−x). The slide 12, in turn, is mounted on ways 13 of fixed base 14 for movement thereon along the ways in the direction indicated by arrows (+y) and (−y).

The movement of the lower slide 12 relative to fixed base 14 is effected by a hydraulic motor 15 comprising a cylinder 16 (shown in cross-section for clarity), having cylindrical chamber 17 therein, and a piston 18 received in chamber 17. Cylinder 16 is connected to base 14 by bolts 19 and piston 18 is connected to slide 12 by means of piston rod 20. The movement of upper slide 10 relative to lower slide 12 is effected by a hydraulic motor 21 comprising a cylinder 22 (shown in cross-section for clarity), having cylindrical chamber 23 therein, and a piston 24 received in chamber 23. Cylinder 22 is connected to lower slide 12 by bolts 25 and piston 24 is connected to slide 10 by means of piston rod 26. The hydraulic motors 15 and 21 are connected into a hydraulic circuit which includes a source of fluid under pressure defined by motor driven hydraulic pump 27. The pump takes fluid from a sump 28 and delivers it under pressure to a pressure line 29. A safety relief valve 30 is connected between the pressure line and a return line 31 which returns exhaust fluid to the sump.

The operation of the two motors 15 and 21, and hence the movements of slides 10 and 12, are controlled by hydraulic valve 32, having housing 33, with an axis A extending therethrough, and having movable valve member 34 received in the housing. As shown best in FIG. 2, the valve 32 comprises two portions: rotary valve portion 32a which controls motor 15, and linear valve portion 32b which controls motor 21.

Figure 3:
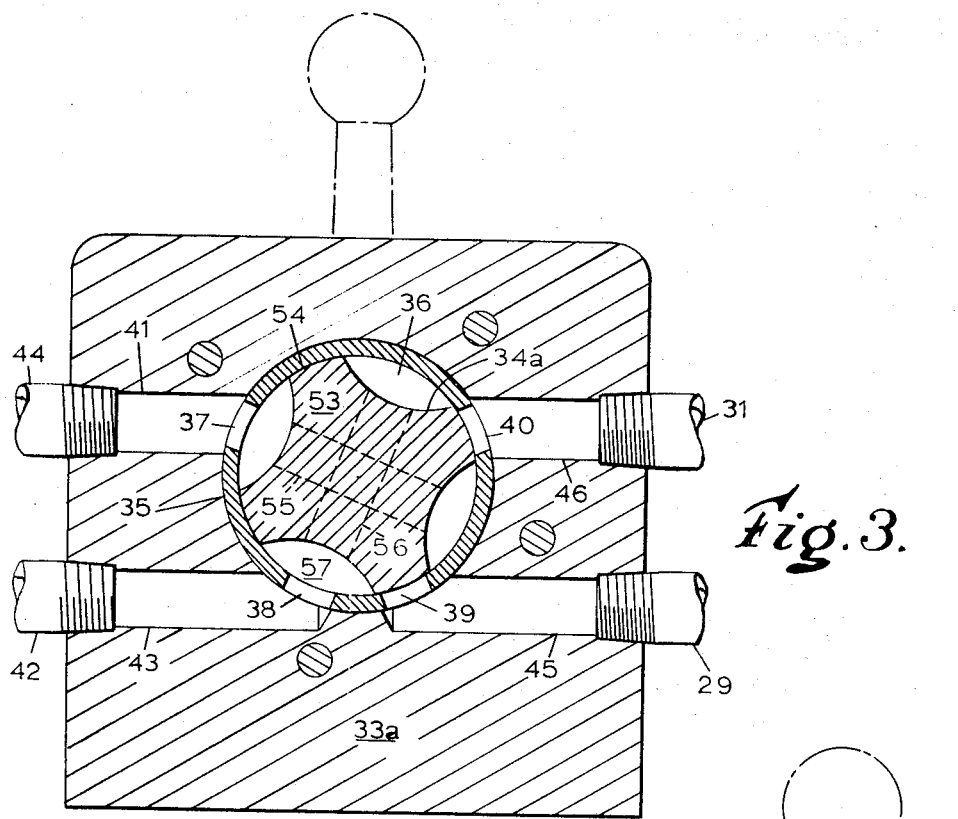
FIG. 3 is a view taken on the line 3—3 of FIG. 2.

The rotary valve portion 32a comprises housing portion 33a, having a sleeve 35 defining a cylindrical chamber 36 therein, and having movable valve member portion 34a received in chamber 36. Four ports 37, 38, 39, and 40 open into chamber 36. These four ports all lie in a common plane B (perpendicular to axis A and central with respect to chamber 36) and are angularly spaced about axis A in that plane, as shown in FIG. 3. Port 37 connects through passage 41 to motor line 44 which is connected to the outer end of cylinder 15. Port 38 connects through passage 43 to motor line 42 which is connected to the inner end of cylinder 15. Port 39 connects through passage 45 to pressure line 29 and port 40 connects through passage 46 to return line 31.

Valve member portion 34a has two end discs 51, 52, and a central portion 53 having four equally spaced lands 54, each of which will block a port when in registration therewith. Central portion 53 has two passages 55, 56 extending therethrough, both of which terminate, at both ends, at the openings 57 between lands 54. The passages 55, 56, extend perpendicularly to each other and are axially spaced apart so they do not connect. The valve member portion 34a is axially movable within chamber 36 but, in any axial position therein, the central portion 53 of the valve member portion is in registration with the plane B of the ports so that the axial position of valve member 34 in no way affects operation of the rotary valve member portion 34a thereof.

Figure 4:
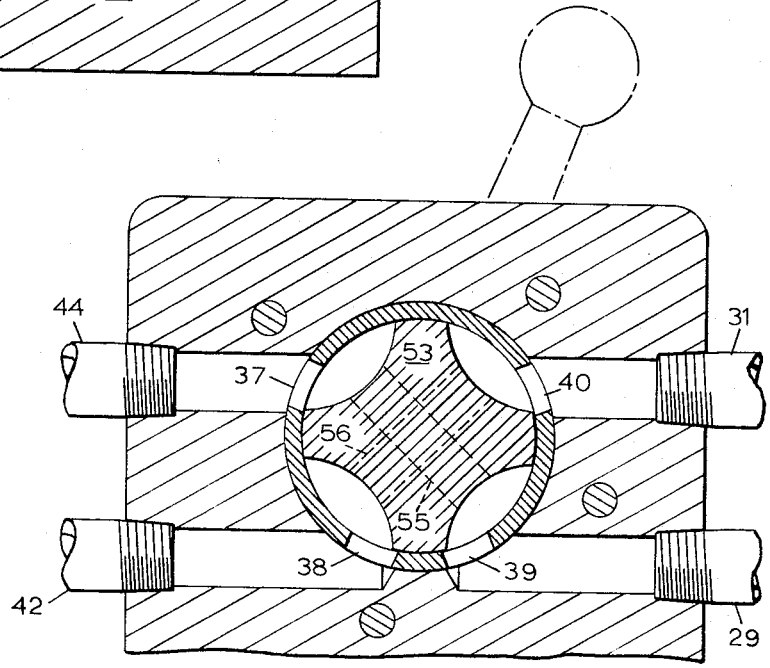
FIGS. 4 and 5 are views similar to FIG. 3 except that the movable valve member has been rotated clockwise and counterclockwise, respectively, from the position of the movable valve member in FIG. 3.
Figure 5:
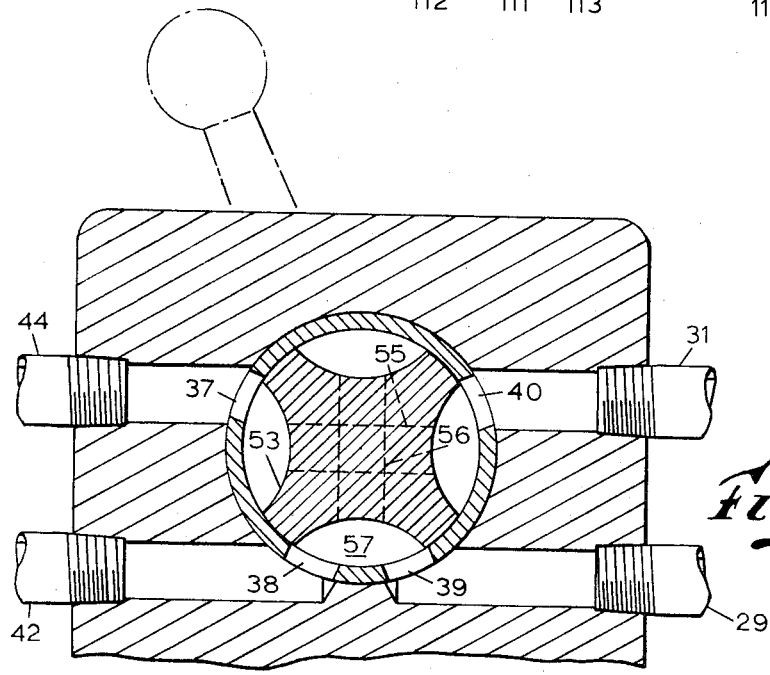

When valve member portion 34a is in the angular position shown in FIG. 3, both motor ports 37, 38 are effectively blocked from the operating ports (that is pressure port 39 connected to the pressure line and exhaust port 40 connected to the return line) so that motor 15 is not operated and slide 12 is at rest. When the valve member portion 34a is rotated clockwise from the position shown in FIG. 3 to the position shown in FIG. 4, the pressure port 39 is connected through passage 55 to motor port 37, thereby connecting pressure line 29 to motor line 44. At the same time, motor port 38 is connected through passage 56 to exhaust port 40, thereby connecting motor line 42 to return line 31. With these pressure conditions across motor 15, the piston 18 thereof moves inwardly to move slide 12 in the sense indicated by arrow (−y). When the valve member portion 34a is rotated counterclockwise from the position shown in FIG. 3 to the position shown in FIG. 5, the pressure port 39 is connected through opening 57 to motor port 38, thereby connecting pressure line 29 to motor line 42. At the same time, motor port 37 is connected through passage 55 to exhaust port 40, thereby connecting motor line 44 to return line 31. With these pressure conditions across motor 15, the piston 18 thereof moves outwardly to move slide 12 in the sense indicated by arrow (+y).

The linear valve portion 32b comprises housing portion 33b, having a sleeve 60 defining a cylindrical chamber 61 therein, and a movable valve member portion 34b received in chamber 61. Chamber 61 is coaxial with, and in communication with, chamber 36. Sleeve 60 has five axially spaced external annular grooves 62, 63, 64, 65, 66 and five axially spaced sets of internal ports 67, 68, 69, 70, 71. The internal sets of ports 67, 68, 69, 70, 71 of sleeve 60 are connected, respectively, to the external annular grooves 62, 63, 64, 65, 66, by radial passages 72. Groove 64, and hence ports 69, are connected through passage 73 to pressure line 29. Grooves 62 and 66, and hence ports 67 and ports 71, are connected through passages 74, 75 to return line 31. Groove 63, and hence ports 68, is connected through passage 76 to motor line 77, which is connected to the outer end of cylinder 22 (the left end as viewed in FIG. 1). Groove 65, and hence ports 70, is connected through passage 78 to motor line 79 which is connected to the inner end of cylinder 22 (the right end as viewed in FIG. 1). Valve member portion 34b has three spaced spools 85, 86, and 87 which define two annular passages 88 and 89 therebetween.

Figure 2:
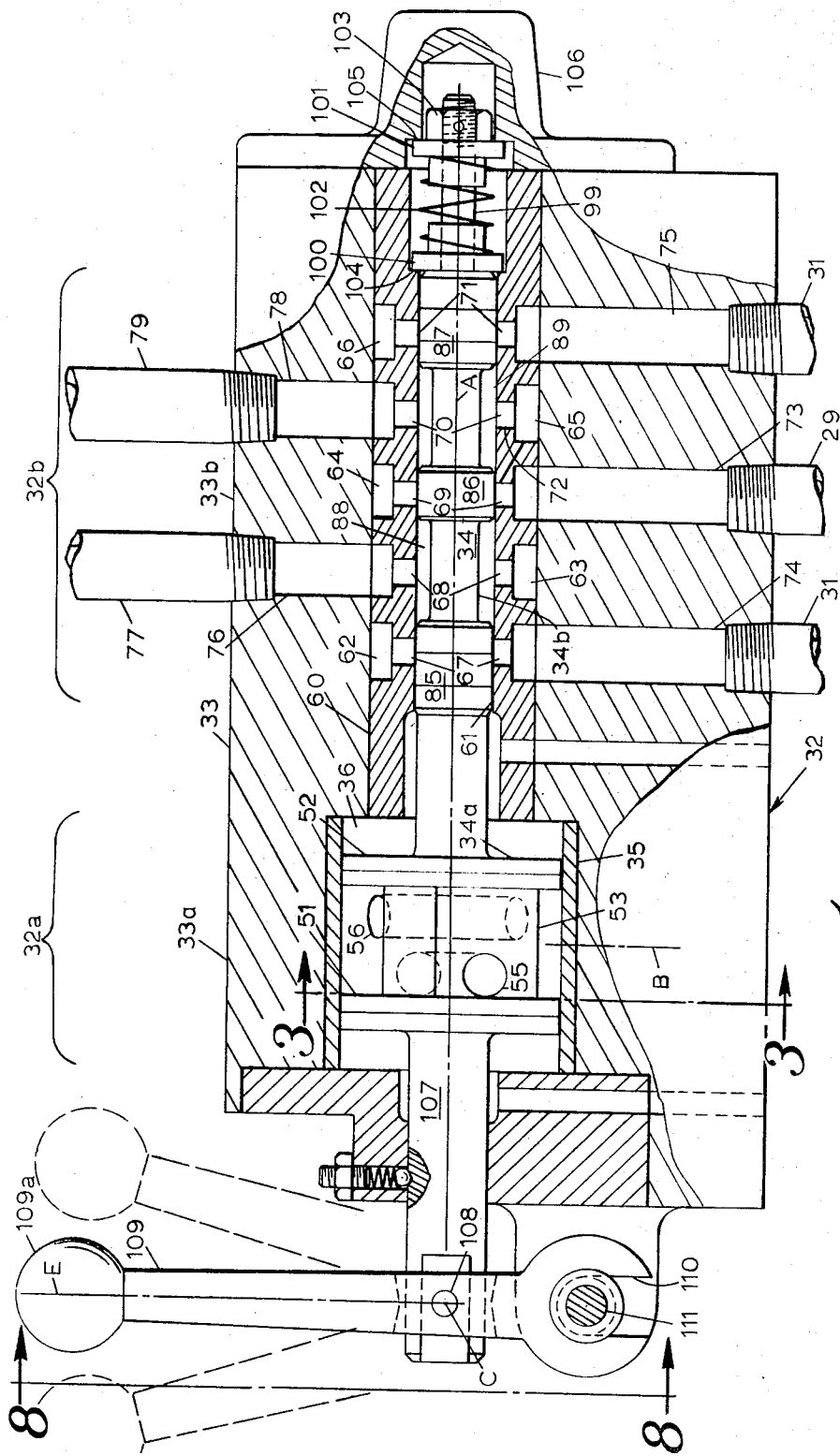
FIG. 2 is a view taken on the line 2—2 of FIG. 1.

When the valve member portion 34b is in the axial position shown in FIG. 2, the operating ports 67, 69, and 71 (that is, the pressure and exhaust ports connected, respectively, to the pressure and return lines) are blocked by the spools 85, 86, and 87, respectively, which are in registration with these ports. Consequently, the motor ports 68 and 70 (that is, the ports connected to the motor lines) are isolated from the pressure line and the return line, and the motor 21 is therefore not operated and slide 10 is at rest on slide 12. When the valve member portion 34b is shifted to the left from the position shown in FIG. 2 to the position shown in FIG. 6, passage 89 connects pressure ports 69 to motor ports 70, thereby connecting pressure line 29 to motor line 79. At the same time, motor ports 68 are connected to exhaust ports 67 through passage 88, thereby connecting motor line 77 to return line 31. With these pressure conditions across motor 21, the piston 24 thereof moves outwardly (to the left as viewed in FIG. 1), thereby moving slide 10 on slide 12 in the sense indicated by arrow (−x). When the valve member portion 34b is shifted to the right from the position shown in FIG. 2 to the position shown in FIG. 7, passage 88 connects pressure ports 69 to motor ports 68, thereby connecting pressure line 29 to motor line 77. At the same time, motor ports 70 are connected to exhaust ports 71 through passage 89, thereby connecting motor line 79 to return line 31. With these pressure conditions across motor 21, the piston 24 thereof moves inwardly (to the right as viewed in FIG. 1), thereby moving slide 10 on slide 12 in the sense indicated by arrow (+x). It will be noted the spools and shoulders thereof are normal to the axis A and the operation of valve member portion 34b is unaffected by the angular position thereof.

Valve member portion 34b has a shaft portion 99 extending therefrom which has a pair of collars 100, 101 thereon urged apart by spring 102. When valve member portion 34b is unrestrained, collar 100 abuts against spool 87 and collar 101 abuts against nut 103 on shaft portion 99. Collar 100 also engages a shoulder 104 on sleeve 60 (which is secured in housing portion 33b) and collar 101 also engages a shoulder 105 on cap 106 secured to the housing. Valve member portion 34b is connected to valve member portion 34a and the spring 102 tends to hold the valve member 34 in the axial position shown in FIG. 2.

The valve member portion 34a has a shaft portion 107 extending therefrom which passes through the end of the housing portion 33a. A pin 108 in shaft portion 107 pivotally connects a handle 109 to the shaft portion. The lower end of handle 109 has a slot 110 in which a rod 111 is received. The rod 111 is secured by blocks 112 (see FIG. 8) in spaced relation to the housing. The handle 109 can be swung about axis C of the rod 108 in a vertical plane D (see FIG. 8) parallel to axis A and passing through axis A. When handle 109 is swung inwardly (FIG. 7), valve member 34 moves to the right, as viewed in FIG. 2, against the bias of spring 102; when handle 109 is swung outwardly (FIG. 6), valve member 34 moves to the left, as viewed in FIG. 2, against the bias of spring 102.

Figure 8:
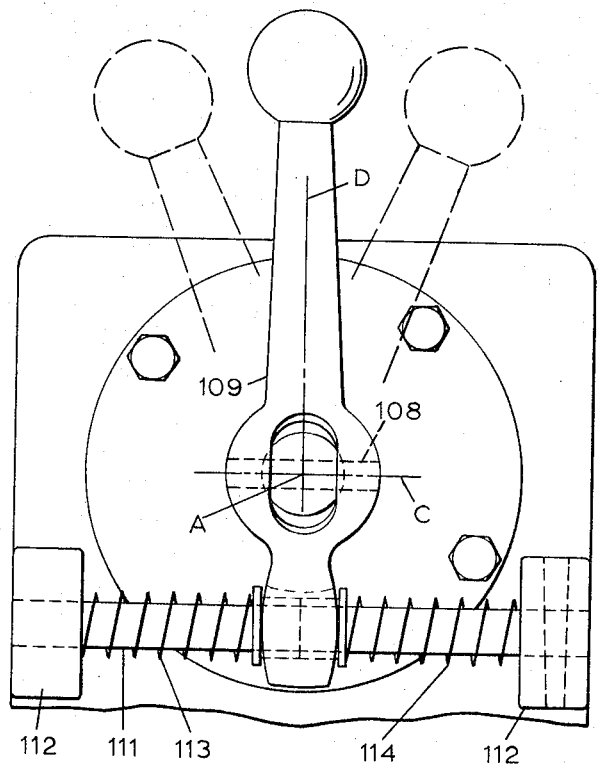
FIG. 8 is a view taken on the line 8—8 of FIG. 2.

The handle 109 can be swung, in a vertical plane E normal to axis A (see FIG. 2), clockwise from the position shown in FIG. 8 (against the bias of spring 113 received on rod 111), or counterclockwise from the position shown in FIG. 8 (against the bias of spring 114 received on rod) about the axis A. It will be noted that clockwise movement of the handle 109 is effected by moving the upper end of the handle to the right (as viewed in FIG. 8), and counterclockwise movement is effected by moving the upper end of the handle 109 to the left (as viewed in FIG. 8). The springs 113 and 114 urge the handle 109 to the position shown in FIGS. 3 and 8.

When the handle is unrestrained, it will assume the position shown in solid lines in FIGS. 2 and 8. The valve member portion 34a will be in the angular position shown in FIG. 3 and the valve member portion 34b will be in the axial position shown in FIG. 2. At this time, neither motor 15 or 21 will be operating and slide 10 and slide 12 will be at rest relative to stationary base 14, as shown in FIG. 9. Movement of the knob 109a at the upper end of handle 109 in the sense and direction indicated by arrow (+x') in FIG. 1 moves slide 10 on slide 11 in the same sense and direction (indicated by arrow +x); movement of knob 109a in the sense and direction indicated by arrow (—x') moves slide 10 on slide 11 in the same sense and direction (indicated by arrow —x). During movement of slide 10 in the x direction by linear movement of valve member portion 34b, there is no rotary movement of the valve member 34 (or valve member portion 34a thereof) so there is no operation of motor 15 or movement of slide 12. Thus valve 32 can operate motor 21 independently of motor 15. Movement of the knob 109a at the upper end of handle 109 in the sense and direction indicated by arrow (+y') moves slide 12, and with it slide 10, in the same sense and direction (indicated by arrow (+y); movement of the knob 109a in the sense and direction indicated by arrow (—y') moves slide 12, and with it slide 10, in the same sense and direction (indicated by arrow (—y). During movement of slide 10 in the Y direction by rotary movement of valve member 34 (and valve member portion 34a thereof), there is no linear movement of the valve member 34 (or valve member portion 34b thereof) so there is no operation of motor 21 or movement of slide 10 on slide 12 in the X direction. Thus, the valve 32 can operate motor 15 independently of motor 21.

Any movement of the knob 109a of handle 109 intermediate the X and Y directions described effects both a rotary and a longitudinal movement of valve member 34. Thus, both motors are operated and controlled simultaneously, effecting simultaneous movement of slide 12 and slide 10. This produces a resultant movement of slide 10 as indicated in FIG. 9. Thus coordinated movement of the slide motors and slides can be effected by the valve member 32.

Thus, with the valve of the present invention, independent or coordinated movement of two motors can be effected with a single valve. Universal movement in a plane can be achieved by operation of a single control handle, the direction and sense of movement of the slide being the same as the direction and sense of movement of the handle.

What is claimed is:

1. A valve for effecting coordinated reversible operation of a first hydraulic motor and a second hydraulic motor in a hydraulic system including a source of fluid under pressure and a sump comprising in combination a housing having an axis extending therethrough, said housing having a first portion with operating ports angularly spaced around said axis for connection to the source and the sump and motor ports angularly spaced around said axis for connection across said first motor, said housing having a second portion with axially spaced operating ports for connection to the source and the sump and axially spaced motor ports for connection across said second motor, a movable valve member having a first portion received in said first portion of the housing, said first valve member portion defining two passages to connect, disconnect, and reversely connect the motor ports of the first housing portion with the operating ports thereof on angular movement to a first, second, and third angular position of said first valve member portion and in any axial position thereof, said valve member having a second portion received in said second portion of the housing, said second valve member portion defining two passages to connect, disconnect, and reversely connect the motor ports of the second housing portion with the operating ports thereof on axial movement to a first, second, and third axial position of said second valve member portion and in any angular position thereof, and a handle connected to said valve member for angular movement thereof as said handle is moved in one direction and for axial movement thereof as said handle is moved in another direction transverse to said one direction.

2. A valve for effecting coordinated reversible operation of a first slide movable in one direction by a first motor and a second slide movable in another direction transverse to said one direction by a second motor in a hydraulic system including a source of fluid under pressure and a sump comprising in combination a housing having an axis extending therethrough, said housing having a first portion with a cylindrical chamber on said axis having operating ports angularly spaced around said axis for connection to the source and the sump and motor ports angularly spaced around said axis for connection across said first motor, said housing having a second portion axially spaced from said first housing portion, said second housing portion having a cylindrical chamber on said axis and in communication with said first cylindrical chamber, said second cylindrical chamber having axially spaced operating ports for connection to the source and sump and axially spaced motor ports for connection across said second motor, a movable valve member having a first portion received in said first portion of the housing, said first valve member portion defining two passages to connect, disconnect, and reversely connect the motor ports of the first housing portion with the operating ports thereof on angular movement to a first, second, and third angular position of said first valve member portion and in any axial position thereof, said valve member having a second portion received in said second portion of the housing, said second valve member portion defining two passages to connect, disconnect, and reversely connect the motor ports of the second housing portion with the operating ports thereof on axial movement to a first, second, and third axial position of said second valve member portion and in any angular position thereof, and a handle connected to said valve member for angular movement thereof as said handle is moved in said one direction to control said first motor and slide and for axial movement thereof as said handle is moved in said other direction to control said second motor and slide.

References Cited by the Examiner
UNITED STATES PATENTS

| | | | |
|---|---|---|---|
| 569,366 | 10/1896 | Wilkin | 137—636 |
| 2,471,289 | 5/1949 | Sedgwick | 137—625 |
| 2,911,006 | 11/1959 | Vogel | 137—625 |
| 2,949,971 | 8/1960 | Cline | 137—625 |
| 2,953,164 | 9/1960 | Haberland | 137—625 |
| 3,055,393 | 9/1962 | Weaver | 137—625 |

M. CARY NELSON, *Primary Examiner.*

W. R. CLINE, *Assistant Examiner.*